United States Patent [19]

Ushio et al.

[11] 4,121,262
[45] Oct. 17, 1978

[54] MAGNETIC RECORDING/REPRODUCING DEVICE

[75] Inventors: Yoji Ushio, Tokyo; Chiaki Taketomi, Yono; Tutomu Asaga, Tokyo, all of Japan

[73] Assignee: Clarion Co., Ltd., Tokyo, Japan

[21] Appl. No.: 791,694

[22] Filed: Apr. 28, 1977

[30] Foreign Application Priority Data

Apr. 30, 1976 [JP] Japan .................................. 51-49659

[51] Int. Cl.$^2$ ...................... G11B 27/02; G11B 15/12
[52] U.S. Cl. .......................................... 360/13; 360/63
[58] Field of Search ........................ 360/13, 15, 63, 92, 360/91, 96

[56] References Cited

U.S. PATENT DOCUMENTS

| 3,295,853 | 1/1967 | Cheng .................................. 360/13 |
| 3,932,886 | 1/1976 | Olms et al. ........................... 360/13 |
| 4,012,784 | 3/1977 | Murphy et al. ....................... 360/63 |

Primary Examiner—Vincent P. Canney
Attorney, Agent, or Firm—Biebel, French & Nauman

[57] ABSTRACT

A magnetic recording/reproducing device in the form of a double cassette tape deck is described. A magnetic recording/reproducing device comprises a first tape transporting portion for a first cassette tape, a second tape transporting portion for a second cassette tape arranged in parallel with the first tape transporting portion, a recording/reproducing head in relation to the first tape transporting portion, a reproducing head in relation to the second tape transporting portion, a single recording system, a single reproducing system, a means for switching the recording/reproducing head from the reproducing system to the recording system in response to the operation of an REC button on the first tape transporting portion, and a means for switching the reproducing system from the recording/reproducing head to the reproducing head in response to the operation of a PLAY button on the second tape transporting portion.

1 Claim, 2 Drawing Figures

MAGNETIC RECORDING/REPRODUCING DEVICE

BACKGROUND OF THE INVENTION

This invention relates to a magnetic recording/reproducing device, and more particularly to a magnetic recording/reproducing device which has expanded the operating range by using a plurality of, preferably two, magnetic tape cassettes.

In recent years, a tape cassette deck as a home mechanical set has become increasingly popular, and, under these circumstances, most of the users require of the tape cassette deck many operations, for example, editing, dubbing, successive reproducing and so forth. However, in order to perform the above-mentioned operations, it is necessary to use at least two independent cassette tape decks, this falling heavily on the user.

SUMMARY OF THE INVENTION

It is an object of the present invention to provide a magnetic recording/reproducing device in the form of a double cassette tape deck.

Another object of the invention is to provide an economical and reliable magnetic recording/reproducing device wherein the above-mentioned operations can be accomplished by using a single recording system and/or a single reproducing system therein.

According to this invention, at least two magnetic tape cassettes can be set on a single cassette deck and be independently operated by at least two related transporting mechanisms, respectively. One transporting mechanism is related to both of a recording system and a reproducing system, and the other transporting mechanism is related only to the reproducing system, whereby the tape cassette set on the former transporting mechanism may be recorded, and the recorded tape cassette may be transferred to the latter transporting mechanism and be reproduced thereby for use as a source of the other tape cassette, and then the recording operation for editing with respect to the other tape cassette may be performed by the former transporting mechanism. Additionally, the device is provided with an operating mode capable of reproducing, in turn, the two tape cassettes set on the related transporting mechanisms, respectively.

DESCRIPTION OF THE PREFERRED EMBODIMENT

Figure 1:
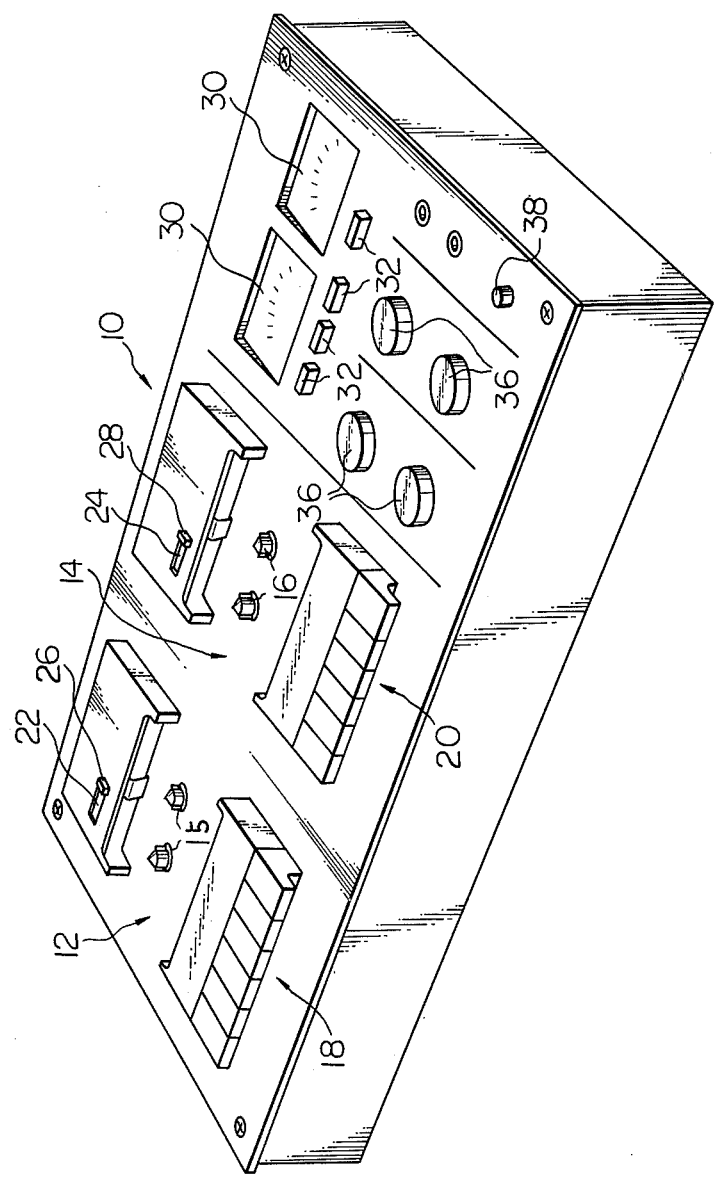
FIG. 1 is an exterior view of a double cassette deck embodying the present invention.

FIG. 1' shows an exterior view of a double cassette deck 10 embodying the present invention. The deck 10 comprises a first transporting portion 12 having a reel axis 15 and a second transporting portion 14 having a reel axis 16. The transporting portions 12 and 14 also include operating keys 18 and 20, respectively, by which each of the transporting portions can be independently operated. The transporting portions 12 and 14 are provided with tape counters 22 and 24, respectively, and further with counter reset buttons 26 and 28, respectively.

Also, the deck 10 includes normal recording/reproducing operating and indicating portions 30, 32 and 36.

The numeral 30, 32 and 36 may be a VU meter, a recording bias selector and an input/output signal level controller, respectively. Numeral 38 represents an ON/OFF switch.

Figure 2:
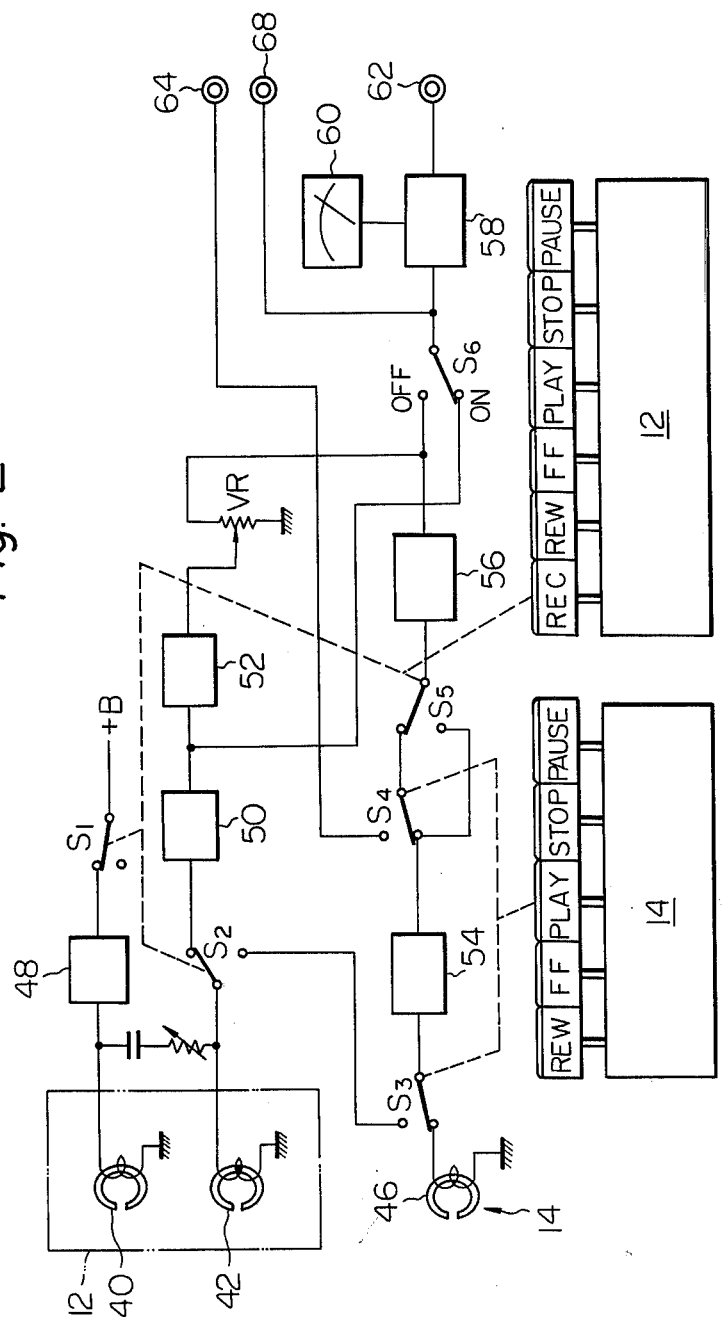
FIG. 2 is a block diagram of the electric circuit of the present invention.

FIG. 2 is a block diagram showing both a recording and a reproducing system in the double cassette deck 10. An eraser head 40 and a recording/reproducing head 42 are related to the first transporting portion 12, and a reproducing head 46 is related to the second transporting portion 14. Reference numeral 48 is given to a recording bias and eraser oscillator, 50 to a recording equalizer, 52 to a buffer amplifier, 54 to a reproducing equalizer, and 56 to a reproducing amplifier, respectively. And reference numeral 58 represents an amplifier which functions as both a meter amplifier for a level meter 60 and a headpoint amplifier for a headphone terminal 62. Terminals 64 and 68 represent a recording signal input and a reproducing signal output, respectively. Switches $S_1$, $S_2$ and $S_5$ are cooperated with an REC button on the tape transporting portion 12, and switches $S_3$ and $S_4$ are cooperated with a PLAY (reproducing) button on the tape transporting portion 14. Switch $S_6$ is a recording/reproducing monitor switch.

When the interlocked switches $S_3$ and $S_4$ are shifted to a different position from the position shown in FIG. 2, and audio signal applied to the input terminal 64 is recorded by the head 42 of the transporting portion 12. In the condition shown in FIG. 2, the interlocked switches $S_1$, $S_2$ and $S_5$ are in a recording mode. When the interlocked switches $S_1$, $S_2$ and $S_5$ are shifted to the other position, that is, a reproducing position, both of the transporting portions 12 and 14 are operable in a reproducing mode in which, for example, the reproducing operation of the transporting portion 14 follows the reproducing operation of the transporting portion 12. For this purpose, the interlocked switches $S_3$ and $S_4$ may be operated automatically or manually in order to cause transference of the reproducing operation from the transporting portion 12 to the transporting portion 14. For accomplishing the above function, the deck 10 may include a mechanism for cooperating with a PAUSE button on the transporting portion 14 in a reproducing mode, the PAUSE button being previously pushed in order not to actuate the transporting portion 14 while the transporting portion 12 is operated, and then being released in order to actuate the transporting portion 14 when the reproducing operation of the transporting portion 12 is completed.

In the next place, according to the device of this invention, it is possible to perform the recording operation for editing by the transporting portion 12 while the transporting portion 14 is reproducing the cassette tape which has been recorded by the transporting portion 12. If the interlocked switches $S_1$, $S_2$ and $S_5$ and the interlocked switches $S_3$ and $S_4$ are in the positions shown in FIG. 2, respectively, a signal derived from the reproducing head 46 is applied to and recorded by recording-/reproducing head 42 successively through the switch $S_3$, the reproducing equalizer 54, the switch $S_4$, the switch $S_5$, the reproducing amplifier 56, the buffer amplifier 52, the recording equalizer 50 and the switch $S_2$.

In the above operating mode, the editing of a cassette tape will be easily accomplished by the unit 58 which can be operated to switch alternately a recording signal and a reproducing signal and to monitor such signals.

According to the embodiment of the present invention, the interlocked switches $S_3$ and $S_4$ are cooperated with the PLAY (reproducing) button in relation to the second transporting portion 14, and are positioned as shown in FIG. 2 only when the PLAY button is pushed. On the other hand, the interlocked switches $S_1$, $S_2$ and $S_5$ are cooperated with the REC (recording) button in relation to the first transporting portion 12, and are positioned as shown in FIG. 2 only when the REC button is pushed.

Accordingly, it will be appreciated that, when the two PLAY buttons corresponding to the transporting portions 12 and 14, respectively, are pushed at the same time, the interlocked switches $S_3$ and $S_4$ cause preferentially the reproducing head 46 to be in a reproducing mode. Also, it will be appreciated that an actuator (not shown) may be provided for selectively energizing any of the two transporting-portion-driving mechanisms in response to the operation of the interlocked switches $S_3$ and $S_4$. This actuator will be able to drive successively the cassette tapes set on the first and second transporting portions 12 and 14, respectively, in accordance with either the recording or reproducing mode of the recording/reproducing head 42 or the reproducing mode of the reproducing head 46.

The switch $S_6$ has ON and OFF positions. In the OFF position, first and second reproducing sound signals are output to the terminal 68, and, in the solo-recording mode of the recording/reproducing head 42, a signal input to the terminal 64 is applied to the terminal 68 after being amplified by the unit 56. In the ON position of the switch $S_6$, the terminal 68 receives a signal which has been passed through a recording level controller VR and the buffer amplifier 52. Therefore, the reproducing signals from the recording/reproducing head 42 and the reproducing head 46 are applied to the terminal 68 after being adjusted in level by the controller VR. In the editing mode as shown in FIG. 2 or the solorecording mode of the recording/reproducing head 42, an actual recording level signal of the head 42 is applied to both of the terminal 68 and the headphone terminal 62.

Incidentally, it has been well known that, when a cassette tape is driven to record and reproduce, a suitable equalization should be selected in order to obtain a flat frequency characteristic, a broad dynamic range and a high S/N. Therefore, it will be appreciated that the device of this invention includes an equalizer switching means for selecting a particular equalizer depending upon the kind of cassette tape, either $CrO_2$ or Standard.

What is claimed is:

1. A magnetic recording/reproducing device in the form of a double cassette deck comprising:
   a first tape transporting portion for a first cassette tape,
   a second tape transporting portion for a second cassette tape,
   a recording/reproducing head in relation to said first tape transporting portion,
   a reproducing head in relation to said second tape transporting portion,
   a single recording system,
   a single reproducing system,
   a first switching means for electrically coupling said recording/reproducing head from said reproducing system to said recording system in response to the operation of an REC button on said first tape transporting portion, and
   a second switching means for electrically coupling said reproducing head from said recording system to said reproducing system in response to the operation of a PLAY button on said second tape transporting portion
   whereby, when both of said PLAY button and said REC button are simultaneously operated, said reproducing head is coupled with said reproducing system and, at the same time, said recording/reproducing head is coupled with said recording system so that the signal in said second cassette is reproduced and then recorded on said first casette tape, while, on the other hand, when both of said PLAY button and a different PLAY button on said first tape transporting portion are simultaneously operated, said reproducing head is coupled with said reproducing system prior to said recording/reproducing head so that the signal in said second cassette tape and the signal in the first cassette tape are successively reproduced in order.

* * * * *